United States Patent
Paynter et al.

(10) Patent No.: US 9,608,343 B2
(45) Date of Patent: Mar. 28, 2017

(54) COAXIAL CABLE AND CONNECTOR WITH CAPACITIVE COUPLING

(71) Applicant: CommScope Technologies LLC, Hickory, NC (US)

(72) Inventors: Jeffrey D. Paynter, Momence, IL (US); Ronald A. Vaccaro, Shorewood, IL (US)

(73) Assignee: CommScope Technologies LLC, Hickory, NC (US)

( * ) Notice: Subject to any disclaimer, the term of this patent is extended or adjusted under 35 U.S.C. 154(b) by 30 days.

(21) Appl. No.: 14/303,745

(22) Filed: Jun. 13, 2014

(65) Prior Publication Data

US 2015/0118898 A1    Apr. 30, 2015

Related U.S. Application Data (63) Continuation-in-part of application No. 14/102,042, filed on Dec. 10, 2013.
(Continued)

(51) Int. Cl.
*H01R 9/05* (2006.01)
*H01R 13/6597* (2011.01)
(Continued)

(52) U.S. Cl.
CPC ....... *H01R 9/0503* (2013.01); *H01R 13/6597* (2013.01); *H02J 50/05* (2016.02); *H01R 13/5219* (2013.01)

(58) Field of Classification Search
CPC .. H01R 9/0503; H01R 13/6597; H01R 24/44; H01R 24/54; H02J 50/05
(Continued)

(56) References Cited

U.S. PATENT DOCUMENTS 7,497,729 B1    3/2009   Wei
7,806,724 B2   10/2010   Paynter et al.
(Continued)

OTHER PUBLICATIONS

International Search Report and Written Opinion for related PCT Application No. PCT/US2014/061685, Date of mailing Jan. 15, 2015, 11 pages.
(Continued)

*Primary Examiner* — Stephen E. Jones
*Assistant Examiner* — Scott S Outten
(74) *Attorney, Agent, or Firm* — Myers Bigel, P.A.

(57) ABSTRACT

A coaxial connector junction includes first and second coaxial connectors. The first coaxial connector includes: a first central conductor extension; a first outer conductor extension spaced apart from and circumferentially surrounding the first central conductor extension; and a first dielectric spacer interposed between the first central conductor extension and the first outer conductor extension. The second coaxial connector includes: a second central conductor extension; a second outer conductor extension spaced apart from and circumferentially surrounding the second central conductor extension; and a second dielectric spacer interposed between the second central conductor extension and the second outer conductor extension. Each of the central conductor extensions and the outer conductor extensions has circular symmetry about the longitudinal axis, such that electrical properties of the engaged first and second coaxial connectors are substantially the same irrespective of the relative orientations of the first and second coaxial connectors about the longitudinal axis.

8 Claims, 6 Drawing Sheets

Related U.S. Application Data (60) Provisional application No. 61/895,113, filed on Oct. 24, 2013.

(51) Int. Cl.
*H01R 13/52* (2006.01)
*H02J 50/05* (2016.01)

(58) Field of Classification Search
USPC ........................................... 333/24 C
See application file for complete search history.

(56) References Cited

U.S. PATENT DOCUMENTS

| | | | |
|---|---|---|---|
| 2002/0030329 A1* | 3/2002 | Montena | H01R 9/0521 |
| | | | 280/1 |
| 2007/0187133 A1 | 8/2007 | Amato | |
| 2008/0170346 A1 | 7/2008 | Van Swearingen | |
| 2009/0009271 A1 | 1/2009 | McKay | |
| 2010/0007441 A1 | 1/2010 | Yagisawa et al. | |
| 2010/0267336 A1 | 10/2010 | Maekawa | |
| 2010/0273349 A1 | 10/2010 | Chen | |
| 2011/0256760 A1 | 10/2011 | Igarashi et al. | |
| 2013/0065415 A1 | 3/2013 | Van Swearingen et al. | |
| 2013/0100571 A1 | 4/2013 | Alkan et al. | |

OTHER PUBLICATIONS

Provided text of the website "http://hyperphysics.phy-astr.gsu.edu/hbase/electric.pplate.html" as per Jan. 3, 2012; by use of web.archive.org, through the address "http://web.archive.org/web/201232335519/hyperphysics.phy-astr.gsu.edu/hbase/electric/pplate.html".

* cited by examiner

COAXIAL CABLE AND CONNECTOR WITH CAPACITIVE COUPLING

RELATED APPLICATION

The present application claims the benefit of and priority from U.S. Provisional Patent Application No. 61/895,113, filed Oct. 24, 2013. The present application is a continuation-in part of, and claims priority from and the benefit of, U.S. patent application Ser. No. 14/102,042, filed Dec. 10, 2013. The disclosures of both of these documents are hereby incorporated herein in their entirety.

FIELD OF THE INVENTION

The present invention is directed generally to electrical cable connectors, and more particularly to coaxial connectors for electrical cable.

BACKGROUND OF THE INVENTION

Coaxial cables are commonly utilized in RF communications systems. A typical coaxial cable includes an inner conductor, an outer conductor, a dielectric layer that separates the inner and outer conductors, and a jacket that covers the outer conductor. Coaxial cable connectors may be applied to terminate coaxial cables, for example, in communication systems requiring a high level of precision and reliability.

Coaxial connector interfaces provide a connect/disconnect functionality between (a) a cable terminated with a connector bearing the desired connector interface and (b) a corresponding connector with a mating connector interface mounted on an apparatus or on another cable. Typically, one connector will include a structure such as a pin or post connected to an inner conductor and an outer conductor connector body connected to the outer conductor; these are mated with a mating sleeve (for the pin or post of the inner conductor) and another outer conductor connector body of a second connector. Coaxial connector interfaces often utilize a threaded coupling nut or other retainer that draws the connector interface pair into secure electro-mechanical engagement when the coupling nut (which is captured by one of the connectors) is threaded onto the other connector.

Passive Intermodulation Distortion (PIM) is a form of electrical interference/signal transmission degradation that may occur with less than symmetrical interconnections and/or as electro-mechanical interconnections shift or degrade over time. Interconnections may shift due to mechanical stress, vibration, thermal cycling, and/or material degradation. PIM can be an important interconnection quality characteristic, as PIM generated by a single low quality interconnection may degrade the electrical performance of an entire RF system. Thus, the reduction of PIM via connector design is typically desirable.

SUMMARY

As a first aspect, embodiments of the invention are directed to a coaxial connector junction comprising first and second coaxial connectors. The first coaxial connector comprises: a first central conductor extension; a first outer conductor extension spaced apart from and circumferentially surrounding the first central conductor extension; and a first dielectric spacer interposed between the first central conductor extension and the first outer conductor extension. The second coaxial connector comprises: a second central conductor extension; a second outer conductor extension spaced apart from and circumferentially surrounding the second central conductor extension; and a second dielectric spacer interposed between the second central conductor extension and the second outer conductor extension. The first coaxial connector engages the second coaxial connector to electrically connect (i) the first and second central conductor extensions and (ii) the first and second outer conductor extensions, the engaged connectors defining a longitudinal axis. Each of the first central conductor extension, the first outer conductor extension, the second central conductor extension, and the second outer conductor extension has circular symmetry about the longitudinal axis, such that electrical properties of the engaged first and second coaxial connectors are substantially the same irrespective of the relative orientations of the first and second coaxial connectors about the longitudinal axis.

As a second aspect, embodiments of the invention are directed to a coaxial connector junction, comprising a first coaxial connector and a second coaxial connector. The first coaxial connector comprises: a first central conductor extension; a first outer conductor extension spaced apart from and circumferentially surrounding the first central conductor extension; and a first dielectric spacer interposed between the first central conductor extension and the first outer conductor extension. The second coaxial connector comprises: a second central conductor extension, the second central conductor extension including a substantially cylindrical cavity therein; a second outer conductor extension spaced apart from and circumferentially surrounding the second central conductor extension; and a second dielectric spacer interposed between the second central conductor extension and the second outer conductor extension. As the first coaxial connector engages the second coaxial connector, the first outer conductor extension at least partially overlies the second outer conductor extension, and a capacitive element is formed between the first outer conductor extension and the second outer conductor extension by a gap therebetween. The connector junction further comprises a retaining member interposed between the first outer conductor extension and the second outer conductor extension, the retaining member configured to prevent relative movement of the first and second coaxial connectors under bending load.

As a third aspect, embodiments of the invention are directed to a coaxial connector junction comprising a first coaxial connector and a second coaxial connector. The first coaxial connector comprises: a first central conductor extension; a first outer conductor extension spaced apart from and circumferentially surrounding the first central conductor extension; and a first dielectric spacer interposed between the first central conductor extension and the first outer conductor extension. The second coaxial connector comprises: a second central conductor extension, the second central conductor extension including a substantially cylindrical cavity therein; a second outer conductor extension spaced apart from and circumferentially surrounding the second central conductor extension; and a second dielectric spacer interposed between the second central conductor extension and the second outer conductor extension. As the first coaxial connector engages the second coaxial connector, the first outer conductor extension at least partially overlies the second outer conductor extension, and a capacitive element is formed between the first outer conductor extension and the second outer conductor extension by a gap therebetween. The connector junction further comprises an RF-absorbent member interposed between the first outer conductor extension and the second outer conductor extension.

As a fourth aspect embodiments of the invention are directed to a coaxial connector junction comprising a first coaxial connector and a second coaxial connector. The first coaxial connector comprises: a first central conductor extension with a dielectric layer applied thereto; a dielectric guard element attached to the first central conductor extension, the guard element having an outermost diameter that is greater than the outermost diameter of the dielectric layer applied to the first central conductor extension; a first outer conductor extension spaced apart from and circumferentially surrounding the first central conductor extension; and a first dielectric spacer interposed between the first central conductor extension and the first outer conductor extension. The second coaxial connector comprises: a second central conductor extension; a second outer conductor extension spaced apart from and circumferentially surrounding the second central conductor extension; and a second dielectric spacer interposed between the second central conductor extension and the second outer conductor extension. The first coaxial connector engages the second coaxial connector to electrically connect (i) the first and second central conductor extensions and (ii) the first and second outer conductor extensions.

DETAILED DESCRIPTION OF EMBODIMENTS OF THE INVENTION

The present invention is described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. It will also be appreciated that the embodiments disclosed herein can be combined in any way and/or combination to provide many additional embodiments.

Unless otherwise defined, all technical and scientific terms that are used in this disclosure have the same meaning as commonly understood by one of ordinary skill in the art to which this invention belongs. The terminology used in the above description is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

Figure 1:
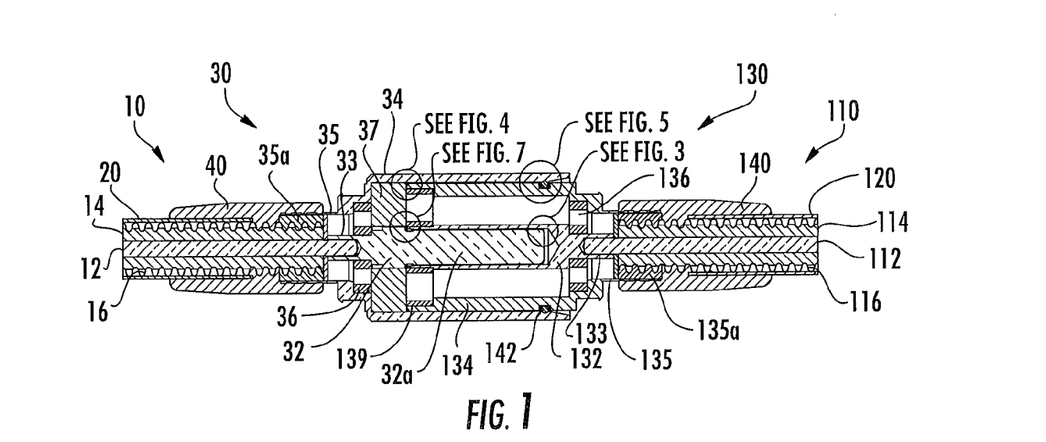
FIG. 1 is a partial cross-section of the coaxial cable-connector assembly according to embodiments of the invention, the assembly being shown in a mated condition.
Figure 2:
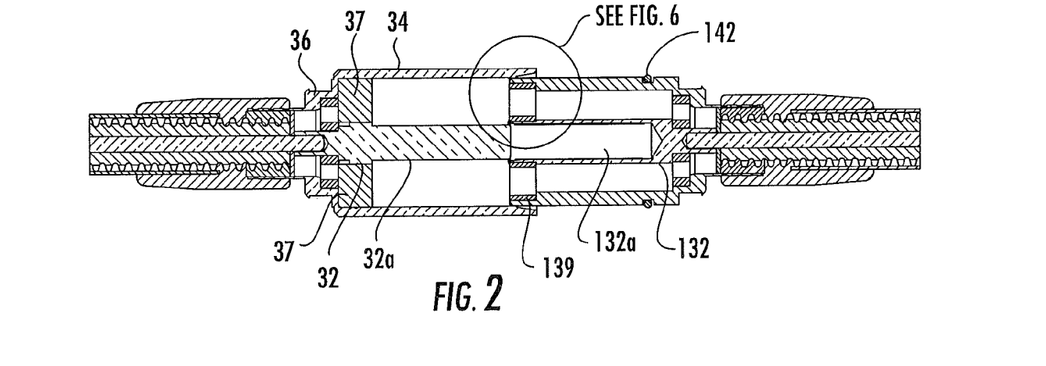
FIG. 2 is a partial cross-section of the coaxial cable-connector assembly of FIG. 1 shown in an unmated condition.

FIGS. 1 and 2 illustrate two coaxial cables, designated broadly at 10 and 110, according to embodiments of the present invention. The cable 10 includes a central conductor 12, a dielectric layer 14 that circumferentially overlies the central conductor 12, an outer conductor 16 that circumferentially overlies the dielectric layer 14, and a polymeric cable jacket 20 that circumferentially overlies the outer conductor 16. Similarly, the cable 110 includes a central conductor 112, a dielectric layer 114 that circumferentially overlies the central conductor 112, an outer conductor 116 that circumferentially overlies the dielectric layer 114, and a polymeric cable jacket 120 that circumferentially overlies the outer conductor 116. These components will be well-known to those of skill in this art and need not be described in detail herein. FIGS. 1 and 2 illustrate that the outer conductors 16, 116 may be of a corrugated profile; alternatively, the outer conductors 16, 116 may not have a corrugated profile. Both of these outer conductor configurations are known to those of skill in this art and need not be described in detail herein.

Referring again to FIGS. 1 and 2, the cable 10 includes a plug 30 that enables the cable 10 to be connected with a jack 130 of the mating coaxial cable 110 (those skilled in this art will recognize that, in some instances, it may be unclear which of two mating connectors is the "plug" and which is the "jack". The terms are largely interchangeable as used herein, as each is intended to refer to a coaxial connector that mates with another mating coaxial cable connector). FIG. 1 shows the plug 30 and jack 130 in their mated condition;

FIG. 2 shows the plug 30 and jack 130 in a largely unmated condition as the jack 130 is being inserted into the plug 30.

Figures 3, 4, 5, 6:
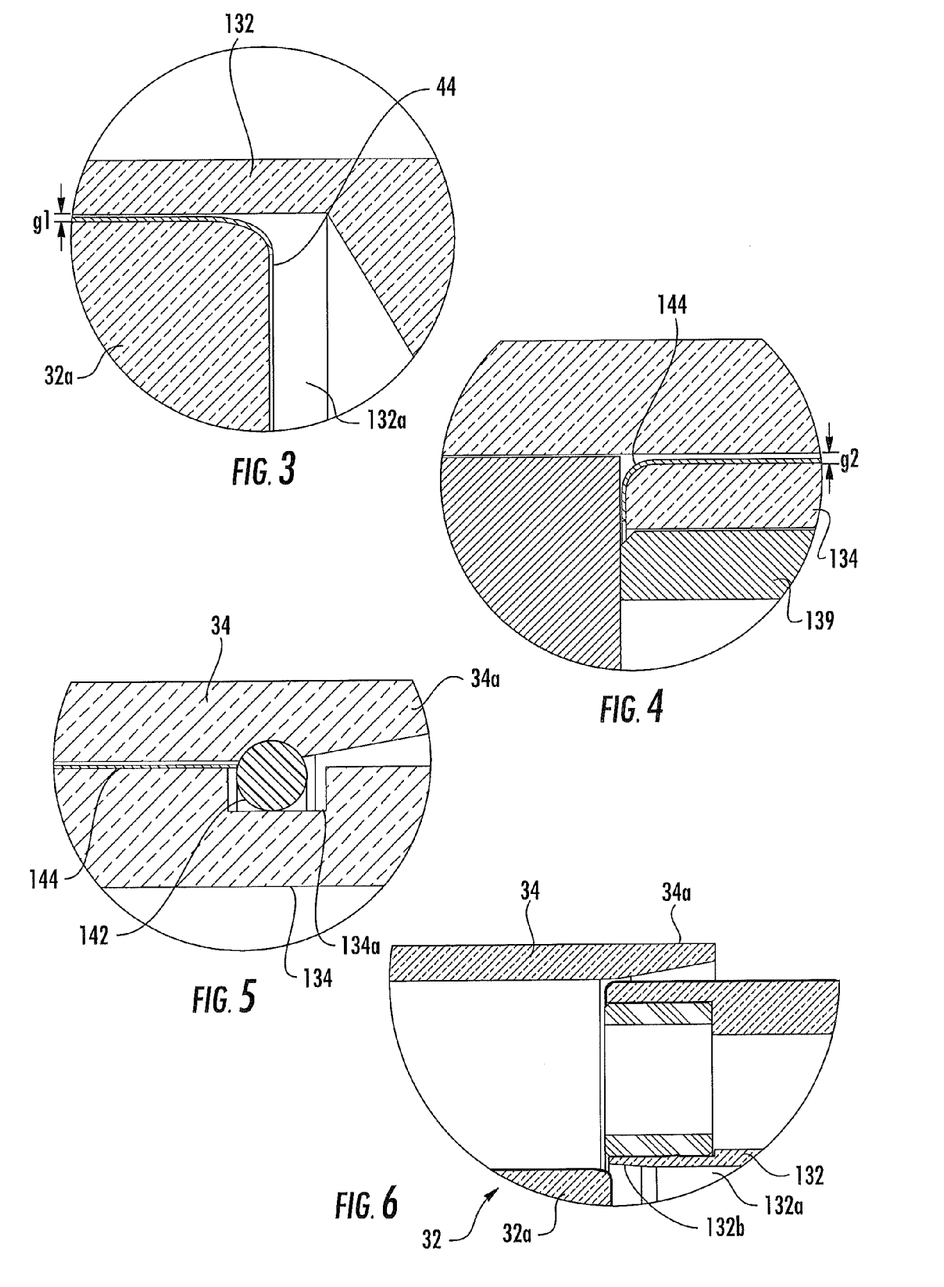
FIG. 3 is an enlarged partial section of the coaxial cable-connector assembly of FIG. 1.
FIG. 4 is an enlarged partial section of the coaxial cable-connector assembly of FIG. 1.
FIG. 5 is an enlarged partial section of the coaxial cable-connector assembly of FIG. 1.
FIG. 6 is an enlarged partial section of the coaxial cable-connector assembly of FIG. 2.

The plug 30 includes a central conductor extension 32, an outer conductor extension 34 and an overmold body 40. The central conductor extension 32 has a generally cylindrical post 32a and is mounted on and is in electrical contact with the central conductor 12 of the cable 10 via a boss 33. As can be seen in FIG. 3, the post 32a has rounded edges at its free end. The outer conductor extension 34 is mounted in electrical contact with the outer conductor 16 of the conductor 10 via a tail 35 that is soldered to the outer conductor 16 at a solder joint 35a. The free end 34a of the outer conductor 34 is bevelled to facilitate insertion of the jack 130 (see FIG. 5). An annular dielectric spacer 36 is positioned between the central conductor extension 32 and the outer conductor extension 34 near the junction between the central conductor 12 and the central conductor extension 32. Another annular dielectric spacer 37 abuts the spacer 36 and maintains separation between the central conductor extension 32 and the outer conductor extension 34. The spacers 36, 37 position the outer conductor extension 34 to be spaced apart from and to circumferentially surround the central conductor extension 32. The central conductor extension 32 includes an annular recess 32b radially inwardly of the spacer 36 (see FIG. 7). The overmold body 40 surrounds the end of the cable 10 and the portion of the tail 35 that is soldered to the outer conductor 16.

Figure 7:
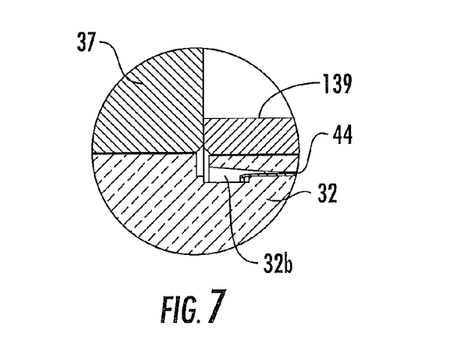
FIG. 7 is an enlarged partial section of the coaxial cable-connector assembly of FIG. 1.

As can be seen in FIG. 3, the post 32a of the central conductor extension 32 underlies a dielectric layer 44. In the illustrated embodiment, the dielectric layer 44 is formed of a polymeric shrink sleeve; in one example, the shrink sleeve may be formed of polyester or PTFE. The dielectric layer 44 is typically between about 0.001 and 0.003 inches in thickness. As can be seen in FIG. 7, the end portion of the sleeve comprising the dielectric layer 44 shrinks into the recess 32b, which helps to fix the dielectric layer 44 in place.

Referring again to FIGS. 1 and 2, the jack 130 includes a central conductor extension 132, an outer conductor extension 134, and an overmold body 140. The central conductor extension 132 is mounted on and is in electrical contact with the central conductor 112 of the cable 110 via a boss 133. The central conductor extension 132 is hollow at its free end, forming a cavity 132a with a bevelled end 132b (see FIGS. 2 and 6). The outer conductor extension 134 is mounted in electrical contact with the outer conductor 116 of the conductor 110 via a tail 135 that is soldered to the outer conductor 116 at a solder joint 135a. As can be seen in FIG. 4, the outer conductor extension 134 has a rounded edge at its free end. An annular dielectric spacer 136 is positioned between the central conductor extension 132 and the outer conductor extension 134 near the junction between the central conductor 112 and the central conductor extension 132. Another annular dielectric spacer 139 is located at the free ends of the central conductor extension 132 and the outer conductor extension 134 and maintains separation between the central conductor extension 132 and the outer conductor extension 134. The spacers 136, 139 position the outer conductor extension 134 to be spaced apart from and circumferentially surround the central conductor extension 132. The overmold body 140 surrounds the end of the cable 110 and the portion of the tail 135 that is soldered to the outer conductor 116. Also, an O-ring 142 is located within an annular recess 134a in the outer conductor extension 134 (see FIG. 5).

A dielectric layer 144 overlies the outer conductor extension 134 (see FIGS. 4 and 5). Like the dielectric layer 44, in the illustrated embodiment, the dielectric layer 144 is formed of a polymeric shrink sleeve; in one example, the shrink sleeve may be formed of polyester or PTFE. The dielectric layer 144 is typically between about 0.001 and 0.003 inches in thickness. As can be seen in FIG. 5, the end portion of the sleeve comprising the dielectric layer 144 shrinks into the recess 134a, which helps to fix the dielectric layer 144 in place.

As shown in FIG. 1, the central conductor extension 32 and the outer conductor extension 34 of the plug 30 are configured to mate with the central conductor extension 132 and the outer conductor extension 134 of the jack 130. More specifically, the post 32a of the central conductor extension 32 of the plug 30 fits within the cavity 132a of the central conductor extension 132 of the jack 130, while the outer conductor extension 134 of the jack 130 fits within the walls of the partially overlying outer conductor extension 34 of the plug 30. The O-ring 142 is compressed radially inwardly by the outer conductor extension 34, thereby forming a watertight seal between the plug 30 and jack 130 (see FIG. 5).

FIG. 3 illustrates that, when the plug 30 and jack 130 are mated, a gap g1 is formed between the outer surface of the post 32a and the inner surface of the central conductor extension 132. In the illustrated embodiment, both the dielectric layer 44 and an air space are present in the gap g1, although in some embodiments the dielectric layer 44 fills the gap g1 entirely, and in other embodiments the gap g1 may have no explicit dielectric layer 44. The presence of the dielectric layer 44 and/or the air space electrically insulates the central conductor extension 32 of the plug 30 from the central conductor extension 132 of the jack 130, thereby forming a capacitive element between these components (see FIG. 3). The capacitive element so created can avoid the generation of PIM that can occur in interconnecting coaxial cables.

Similarly, and as can be seen in FIG. 4, a gap g2 is formed between the outer surface of the outer conductor extension 134 of the jack 130 and the inner surface of the outer conductor extension 34 of the plug 30. In the illustrated embodiment, both the dielectric layer 144 and an air space are present in the gap g2, although in some embodiments the dielectric layer 144 fills the gap g2 entirely, and in other embodiments the gap g2 may have no explicit dielectric layer 144. The presence of the dielectric layer 144 and/or the air space electrically insulates the outer conductor extension 134 of the jack 130 from the outer conductor extension 34 of the plug 30, thereby forming a capacitive element between these components that can avoid the generation of PIM.

The central elements when mated form a resonant cavity, which allows the mated plug 30 and jack 130 to be "tuned" to operate beneficially and/or optimally at particular frequencies. This can be achieved by selecting a combination of cavity length, type of dielectric material, thickness of dielectric material, and/or thickness of the air space to provide a desired capacitance. Typically minimizing the air space can provide a broadband improvement in reflection by reducing the distance between the conductors, thus increasing the capacitance. Air gaps may be used when necessary or desirable to allow for ease of insertion given tolerances of the assembled parts.

In some embodiments, air space in the gap g1 and/or the gap g2 can provide a dampening effect during mating of the plug 30 and the jack 130. For example, if the air space in the gap g2 is between about 0.05 and 0.15 mm, air flow from the cavity of the plug 30 upon insertion of the jack 130 is sufficiently restricted that, as insertion proceeds, an air "cushion" is formed. In some prior connectors, and in particular blind-mated connectors (such as blind mated interfaces associated with heavy antenna/radio-head, etc.) there is a danger of the interfaces slamming together and damaging connector parts, brackets, fasteners and the like. With a restricted air flow that creates a built-in air cushion, time is required to allow the air to leak out of the interface. This can produce a "soft" mating, which can eliminate the danger associated with components slamming together.

As can be seen in FIG. 6, the rounded outer edge of the free end of the outer conductor extension 134 of the jack 130 can facilitate insertion of the outer conductor extension 134 within the outer conductor extension 34 of the plug 30. Insertion is also aided by the slight bevelling in the free end 34a of the outer conductor extension 34 of the plug 30 (see again FIG. 6). In a similar manner, and as shown in FIG. 3, the rounded edge of the free end of the post 32a of the central conductor extension 32 of the plug 30 can facilitate insertion of the central conductor extension 32 within the cavity 132a of the central conductor extension 132 of the jack 130.

Notably, and as can be seen in FIGS. 2 and 6, the outer conductor extension 34 extends farther away from the cable 10 (and deeper into the jack 130) than does the central conductor extension 32, such that, when the plug 30 and jack 130 are brought together to mate as in FIGS. 2 and 6, the outer conductor extension 134 of the jack 130 contacts and engages the outer conductor extension 34 prior to engagement of the central conductor extensions 32, 132. The bevelled end 34a of the outer conductor extension 34 tends to "center" the jack 130 relative to the plug 30, thereby facilitating engagement and mating of the central conductor extensions 32, 132. Engagement of the central conductor extensions 32, 132 is also facilitated by the bevelling of the end 132b of the central conductor extension 132 (see FIG. 6).

As shown in FIGS. 1 and 4, mating of the plug 30 and jack 130 is complete when the jack 130 "bottoms out" against the plug 30, which occurs when the spacer 139 of the jack 130 contacts the spacer 37 of the plug 30. As can be seen in FIG. 7, the spacer 139 extends slightly farther away from the cable 110 (and deeper into the plug 130) than does the central conductor extension 132, such that the central conductor extension 132 is prevented from contact and electrical connection with the central conductor 32, thereby preserving the capacitively coupled electrical connection created by the dielectric layer 44.

In addition to the materials discussed above, exemplary materials for the dielectric layers 44, 144 include other polymeric materials, ceramic materials, and glass. The dielectric strength of the materials of the dielectric layers 44, 144 is typically above about 8 MV/m. Although application as a shrink sleeve is illustrated and described herein, the dielectric layers 44, 144 may be applied in a number of different ways, including painting, spraying, sputter coating, or the like. In some embodiments, the capacitive element is sized and arranged so that it creates capacitance on the order of 10-50 pico farads between the conductor extensions 32, 34 of the plug 30 and the respective conductor extensions 132, 134 of the jack 130.

Although the plug 30 and jack 130 are illustrated herein attached to free coaxial cables 10, 110, in some embodiments one of these connectors may be mounted within a structure, such as a shoulder plate such as that described in co-pending and co-assigned U.S. Patent Publication No. 2013/0065415, the disclosure of which is hereby incorporated herein by reference, that presents multiple connectors at once. Such a shoulder plate or similar mounting structure may be mounted on an antenna, remote radio head or the like.

Referring now to FIGS. 8-11, another coaxial cable-connector assembly, designated broadly at 200, is shown therein. The assembly 200 includes a plug 230 and a jack 330; the plug 230 is attached to a coaxial cable 210 of similar construction to that described above, and the jack 330 is attached to a coaxial cable 310, also of similar construction. The plug 230 and the jack 330 are described below.

Figure 8:
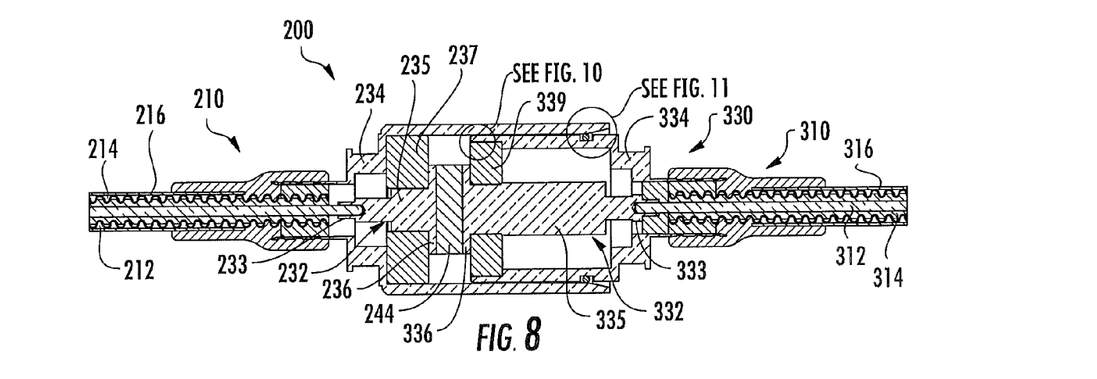
FIG. 8 is a partial cross-section of a coaxial cable-connector assembly according to additional embodiments of the invention, with the assembly shown in a mated condition.
Figure 9:
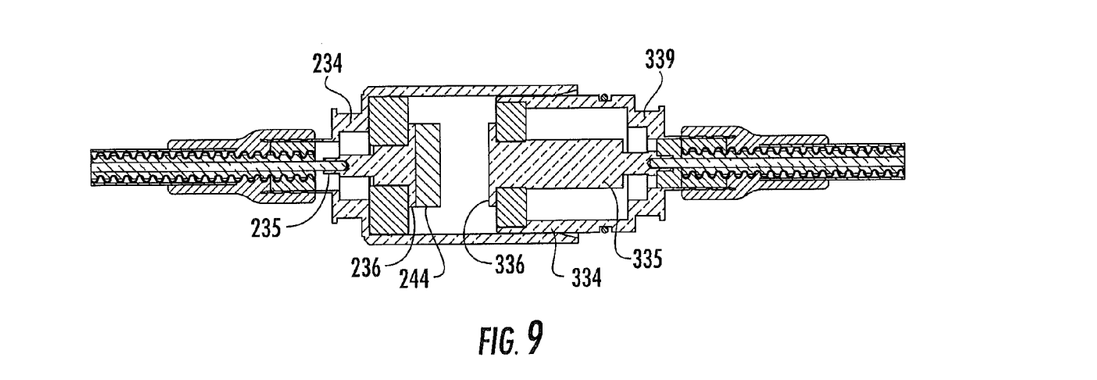
FIG. 9 is a partial cross-section of the coaxial cable-connector assembly of FIG. 8 shown in an unmated condition.
Figure 10:
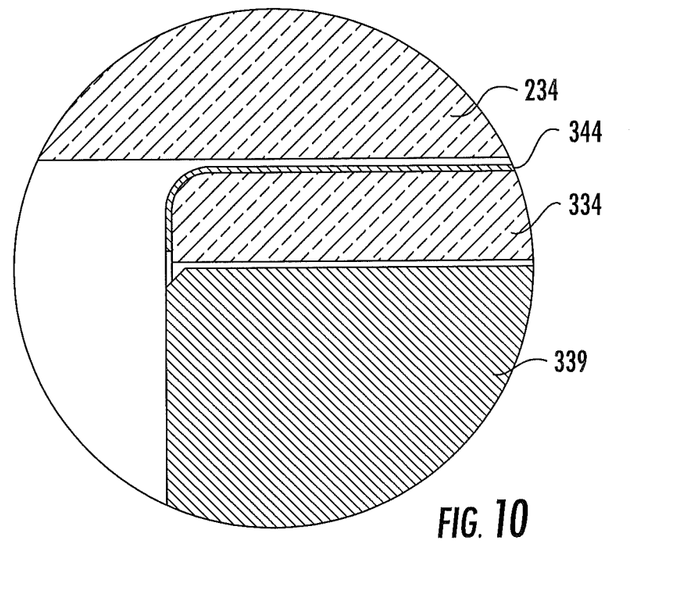
FIG. 10 is an enlarged partial section of the coaxial cable-connector assembly of FIG. 8.
Figure 11:
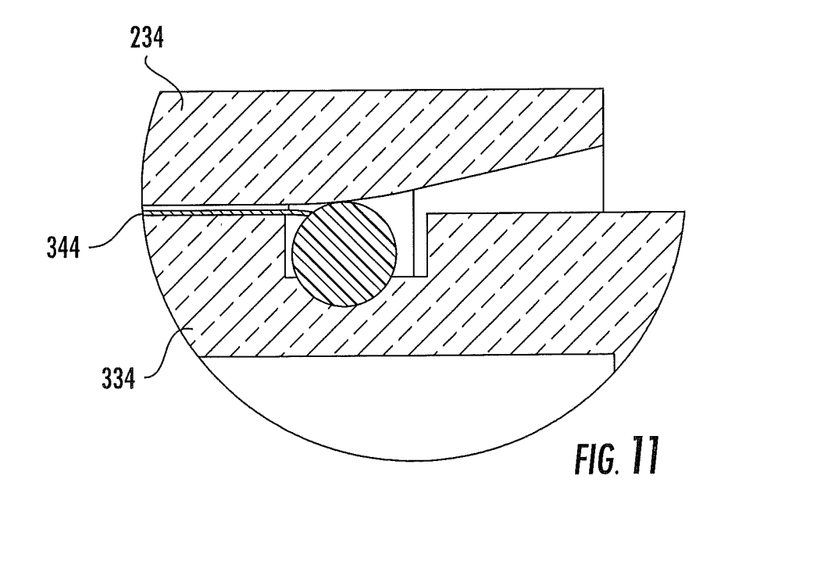
FIG. 11 is an enlarged partial section of the coaxial cable-connector assembly of FIG. 8.

The plug 230 includes an outer conductor extension 234 similar in configuration to the outer conductor extension 34 of the plug 30. The plug 230 further includes a central conductor extension 232 with a boss 233 that fits over the central conductor 212 of the cable 210. A body 235 is attached to the boss 233. A dielectric spacer 237 is positioned between the body 235 and the outer conductor extension 234. A circular flange 236 extends from the free end of the body 235 opposite the boss 233.

A dielectric disk 244 with a flat contact surface is mounted on the flange 236. The dielectric disk 244 may be formed of any number of dielectric materials. In some embodiments, the dielectric disk may be formed of polyester, PTFE, ceramic, glass or the like. Typically, the dielectric disk 244 is between about 0.001 and 0.003 inches in thickness (the thickness of the dielectric disk 244 is greatly exaggerated in FIGS. 8 and 9 for illustrative purposes).

The jack 330 includes an outer conductor extension 334 that is similar to the outer conductor extension 134 of the jack 130 described above. The outer conductor extension 334 is covered with a dielectric layer 344 similar to the dielectric layer 144 described above (FIGS. 10 and 11). A central conductor extension 332 is attached at one end to the central conductor 312 of the cable 310 via a boss 333. The central conductor extension 332 includes a solid body 335 that extends away from the boss 333. A circular flange 336 with a flat contact surface extends from the free end of the body 335 that is opposite the boss 333. The flange 336 is sized to be similar in diameter to the flange 236 of the plug 230. A dielectric spacer 339 is positioned between the body 335 of the central conductor extension 332 and the outer conductor extension 334 so that it abuts the underside of the flange 336.

As can be seen in FIGS. 8 and 9, the plug 230 and jack 330 can be mated by inserting the outer conductor extension 334 of the jack 330 within the outer conductor extension 234 of the plug 230. Insertion proceeds until the contact surface of the flange 336 of the jack 330 contacts the contact surface of the dielectric disk 244 of the plug 230. At this point the outer conductor extension 234 of the plug 230 is electrically insulated from the outer conductor extension 334 of the jack 330, and the flange 236 of the plug 230 is electrically insulated from the flange 336 of the jack 330, thereby creating capacitive coupling that can minimize or prevent PIM.

Those skilled in this art will appreciate that the plug 230 and jack 330 may take different forms. For example, the central conductor extensions 232, 242 need not have flanges 236, 336 that extend radially outwardly from their respective bodies 235, 335, but instead may present contact surfaces that are the same size or even narrower than the bodies 235, 335. The dielectric disk 244 may be a dielectric elements of another configuration. Also, the dielectric disk 244 may be attached to the central conductor extension 332 of the jack 330 rather than to the central conductor extension 232 of the plug 230. Other variations may also be employed.

Figure 12:
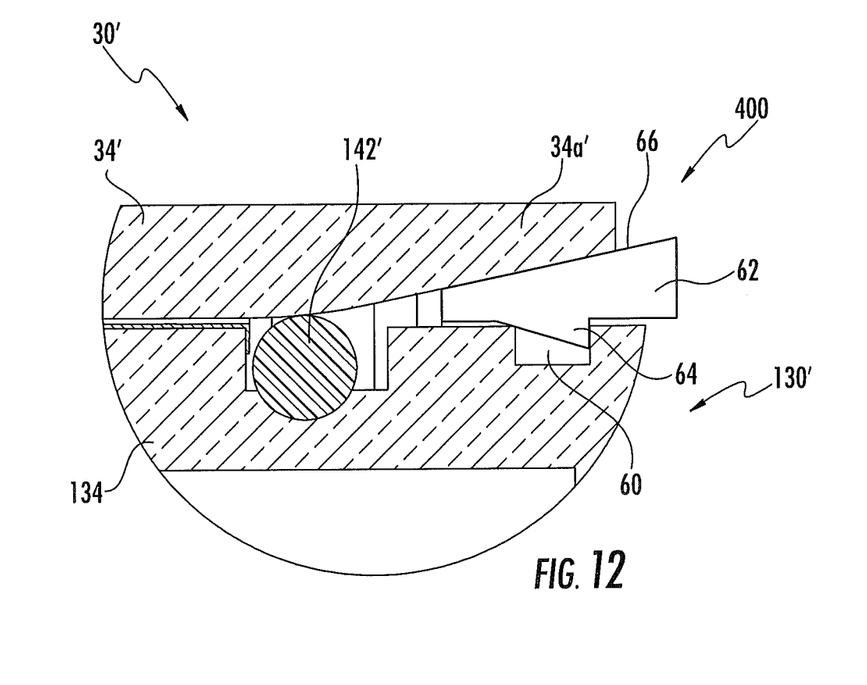
FIG. 12 is an enlarged partial cross-section of a coaxial cable-connector assembly according to further embodiments of the invention, with the assembly shown in a mated condition.

FIG. 12 illustrates another embodiment of an RF coaxial cable-connector assembly, designated broadly at 400, that includes a plug 30' and a jack 130' (only portions of which are shown in FIG. 12). The outer conductor extension 34' of the plug 30' of the assembly 400 may be of the same construction as described above for the outer conductor extensions 34, 234. The outer conductor extension 134' of the jack 130' of the assembly 400 is similar to the outer conductor extensions 134, 334, but also includes an annular, outwardly-facing recess 60 located such that it is positioned radially inwardly of the beveled end 34a' of the outer conductor extension 34' when the plug 30' and the jack 130' are mated. An annular retaining ring 62 includes an inwardly-extending projection 64 that fits within the recess 60. The retaining ring 62 is generally cuneate (i.e., wedge-shaped) in cross-section, with its narrower end pointing toward the O-ring 142', The outer surface 66 of the retaining ring 62 contacts the inner surface of the beveled end 34a' of the outer conductor extension 34'.

The retaining ring 62 is typically formed of a dielectric material. Exemplary materials include polymeric materials such as PFTE, hard rubber and TPX. The material may also have a hardness of about 60 Shore D or higher.

The retaining ring 62 can provide the assembly 400 with additional safeguards against PIM. As noted above, in some embodiments there may be a gap present between (a) the outer conductor extension 34' of the plug and the outer conductor extension 134' of the jack, (b) the inner conductor extension 32 of the plug and the inner conductor extension 132 of the jack, or both (a) and (b). In such embodiments, the gap imposes a dielectric effect on the connectors. However, if the assembled plug and jack are subjected to outside forces (in particular bending forces, which may be present if the assembled cables are bent such that the radius of curvature of the cables on either side of the plug and jack is decreased), shifting of the plug and jack relative to each other may occur. Such shifting may result in distortion of an RF signal and/or unintentional DC contact between components. The retaining ring 62 may prevent shifting by buttressing the relative positions of the plug and jack.

In addition, if the retaining ring 62 is formed of an RF-absorbent material, the retaining ring 62 may serve to increase electrical isolation and/or decrease RF leakage.

Figure 13:
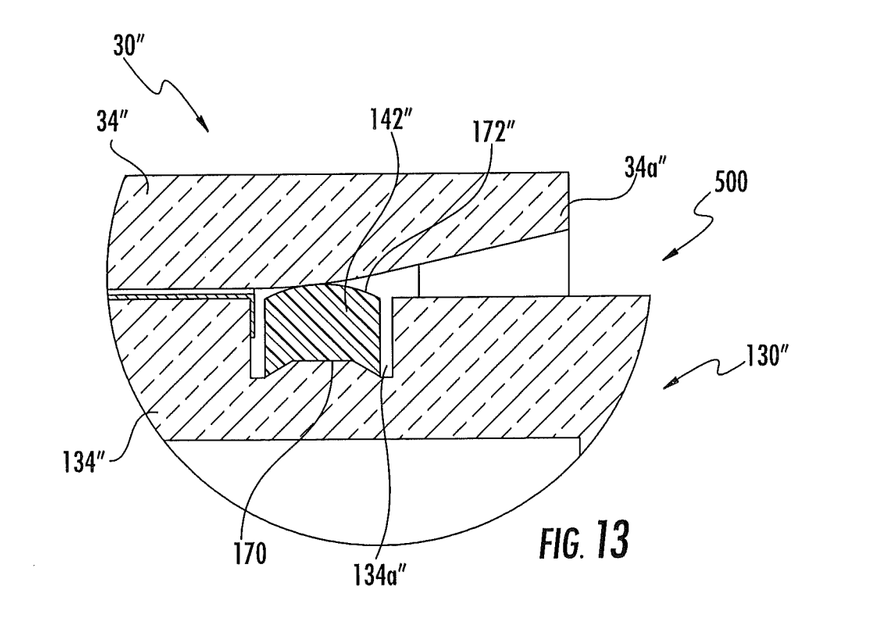
FIG. 13 is an enlarged partial cross-section of a coaxial cable-connector assembly according to further embodiments of the invention, with the assembly shown in a mated condition.

Referring now to FIG. 13, an alternative assembly, designated broadly at 500, is illustrated therein. The assembly 500 (which includes a plug 30" and a jack 130") provides a slightly different approach to the shifting and RF leakage issues discussed above. In particular, the outer conductor extension 134" of the jack 130" includes a convex surface 170 in the recess 134a". Also, the O-ring 142 is replaced with a gasket 142" having a generally square or rectangular cross-section. When the gasket 142" is fitted within the recess 134a", the convex surface 170 deforms the gasket 142" to have a convex outer surface 172. The outer surface 172 presses against the inner surface of the beveled end 34a" of the outer conductor extension 34" of the plug 30", and thereby can provide the position stabilizing effect described above in connection with the retaining ring 62.

The gasket 170 is typically formed of a dielectric material. Exemplary materials include polymeric materials such as PFTE and silicone rubber. The material may also have a hardness of between about 40 and 90 Shore D. The material may also be RF-absorbent.

Those skilled in this art will recognize that structures other than the retaining ring 62 and the gasket 170 may be employed to maintain the proper spacing of the plug and jack when mated. Such a structure may be configured to inhibit collapsing of the gap between the outer conductor extensions 34, 134 and/or the gap between the inner conductor extensions 32, 132, particularly when subjected to bending forces Referring now to FIGS. 14 and 15, an alternative assembly, designated broadly at 600, is illustrated therein. The assembly 600 includes a plug 630 and a jack 730, wherein the jack 730 may be similar or identical to the jack 130 discussed above. The plug 630 may be similar to the plug 30 discussed above, but with some variation in the inner conductor extension 632. More specifically, the inner conductor extension 632 is illustrated as a hollow cylinder 636 rather than as a solid post. The cylinder 636 has a dielectric layer 644 (typically in the form of a coating) on its outer surface. Moreover, at its open end the cylinder 636 receives a dielectric guide element 638. The guide element 638 has a post 640 that fits within the cylinder 636 and a frustoconical guard 642 that resides beyond the end of the cylinder 636. The guard 642 has an outermost diameter O that is greater than the diameter of the dielectric layer 644.

Figure 14:
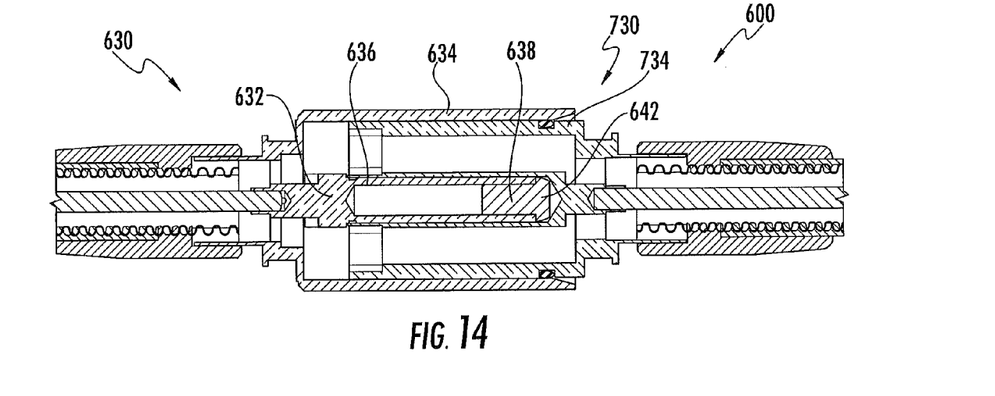
FIG. 14 is an enlarged partial cross-section of a coaxial cable-connector assembly according to further embodiments of the invention, with the assembly shown in a mated condition.
Figure 15:
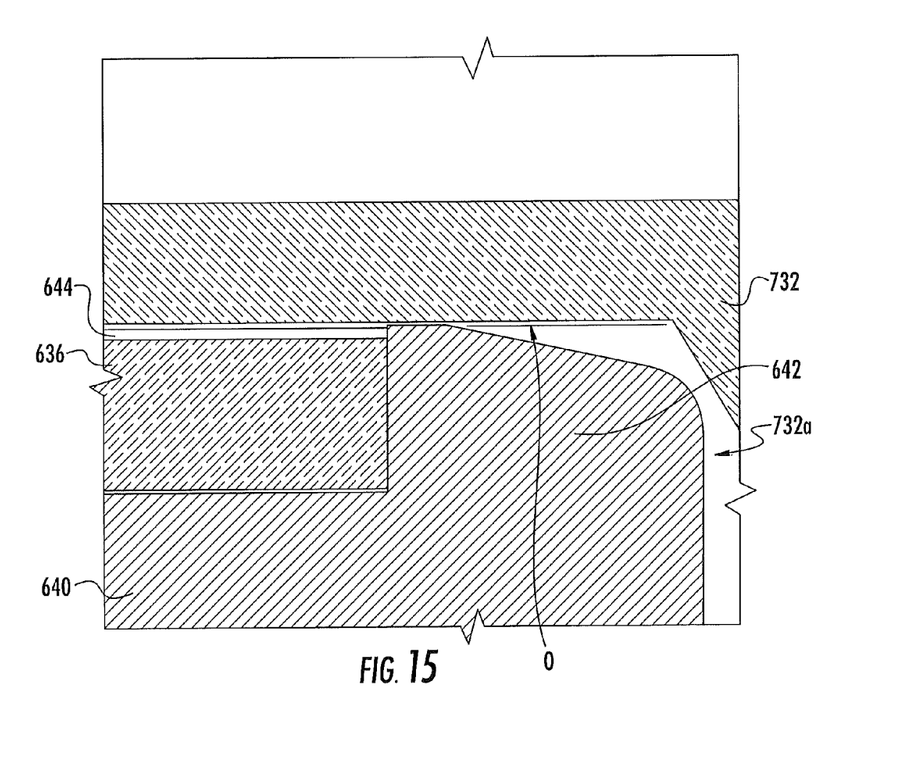
FIG. 15 is a greatly enlarged partial cross-section of the coaxial cable-connector assembly of FIG. 14.

The guard 642 can protect the dielectric layer 244 during insertion of the cylinder 636 into the cavity 732a of the central conductor extension 732 of the jack 730. Because the outer diameter O of the guard 742 exceeds that of the dielectric layer 644, the guard 642 will contact the inner surface of the cavity 732a rather than allowing the dielectric layer 644 to do so, thereby preventing banging, scraping and the like of the dielectric layer 644 during insertion.

In some embodiments, the dielectric layer 644 between the central conduction extension 632 of the plug 630 and the central conductor extension 732 of the jack 730 may be formed of a different dielectric material than the dielectric layer (not visible in FIGS. 14 and 15) between the outer conductor extension 634 of the plug 630 and the outer conductor extension 734 of the jack 730. In particular, in some embodiments the dielectric layer 644 between the central conductor extensions 632, 732 may have a higher dielectric strength than that of the dielectric layer between the outer conductor extensions 634, 734. Inasmuch as higher dielectric strength materials may be more brittle or susceptible to scratching, the inclusion of the guard 642 may be desirable in connection with such high dielectric strength materials.

Those skilled in this art will appreciate that, in some embodiments, the outer conductor extension of the jack may also benefit from a guard that protects a dielectric layer applied thereto.

It should also be noted any of the plugs and jacks described above have circular symmetry about the longitudinal axis created by the mated assembly, such that a plug and corresponding jack may be mated with each other in any orientation about the longitudinal axis. More specifically, a plug may be rotated to any orientation about the longitudinal axis and still be mated with a mating jack, irrespective of the orientation of the jack about the longitudinal axis, without changing the electrical performance of the mated assembly, including return loss, passive modulation and PIM. This capability can significantly facilitate mating of a jack and plug, particularly in locations that are difficult for an operator to reach.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifi- That which is claimed is:

1. A coaxial connector junction, comprising:
   (a) a first coaxial connector, comprising:
   a first central conductor extension;
   a first outer conductor extension spaced apart from and circumferentially surrounding the first central conductor extension; and
   a first dielectric spacer interposed between the first central conductor extension and the first outer conductor extension;
   (b) a second coaxial connector that is repeatedly separable from the first coaxial connector, comprising:
   a second central conductor extension, the second central conductor extension including a substantially cylindrical cavity therein;
   a second outer conductor extension spaced apart from and circumferentially surrounding the second central conductor extension; and
   a second dielectric spacer interposed between the second central conductor extension and the second outer conductor extension;
   wherein as the first coaxial connector engages the second coaxial connector, the first outer conductor extension at least partially overlies the second outer conductor extension, and a capacitive element is formed between the first outer conductor extension and the second outer conductor extension by an air gap therebetween; and
   wherein the connector junction further comprises a retaining member interposed between the first outer conductor extension and the second outer conductor extension, the retaining member configured to prevent relative movement of the first and second coaxial connectors under a bending load and thereby maintain the air gap between the first outer conductor extension and the second outer conductor extension.

2. The coaxial connector junction defined in claim 1, wherein, in a relaxed state, the retaining member has a rectangular cross-section.

3. The coaxial connector junction defined in claim 2, wherein the retaining member overlies a convex surface in the second outer conductor extension, the convex surface inducing an outer surface of the retaining member into a convex profile.

4. The coaxial connector junction defined in claim 1, further comprising a sealing member interposed between the first outer conductor extension and the second outer conductor extension.

5. The coaxial connector junction defined in claim 1, wherein the retaining member comprises an RF-absorbent material.

6. The coaxial connector junction defined in claim 1, wherein the retaining member has a generally wedge-shaped profile.

7. The coaxial connector junction defined in claim 1, wherein the first outer conductor extension has a beveled edge.

8. The coaxial connector junction defined in claim 1, wherein the first central conductor extension has a post, and the second central conductor extension has a hollow cavity, and wherein, upon engagement, the post of the first central conductor extension is inserted into the cavity of the second central conductor extension such that a capacitive element is created between the first and second central conductor extensions by a gap between the first central conductor extension and the second central conductor extension.

* * * * *

UNITED STATES PATENT AND TRADEMARK OFFICE
CERTIFICATE OF CORRECTION

PATENT NO. : 9,608,343 B2  
APPLICATION NO. : 14/303745  
DATED : March 28, 2017  
INVENTOR(S) : Paynter et al.

Page 1 of 1

It is certified that error appears in the above-identified patent and that said Letters Patent is hereby corrected as shown below:

On the Title Page

Assistant Examiner:
Please correct "Scott S Outten" to read -- Samuel S. Outten --

In the References:
(56) References Cited, Page 2, Other Publications, Line 2:
Please correct "hbase/electric.pplate.html"" to read -- hbase/electric/pplate.html" --

Page 2, Other Publications, Line 3:
Please correct "address http://web" to read -- address https://web --

Page 2, Other Publications, Line 4:
Please correct "201232335519/hyperphysics" to read -- 20120103235519/http://hyperphysics --

Signed and Sealed this
Seventh Day of November, 2017

Joseph Matal
*Performing the Functions and Duties of the*
*Under Secretary of Commerce for Intellectual Property and*
*Director of the United States Patent and Trademark Office*